No. 812,834. PATENTED FEB. 20, 1906.
B. E. ELDRED.
OSCILLATING CEMENT KILN.
APPLICATION FILED JAN. 23, 1905.
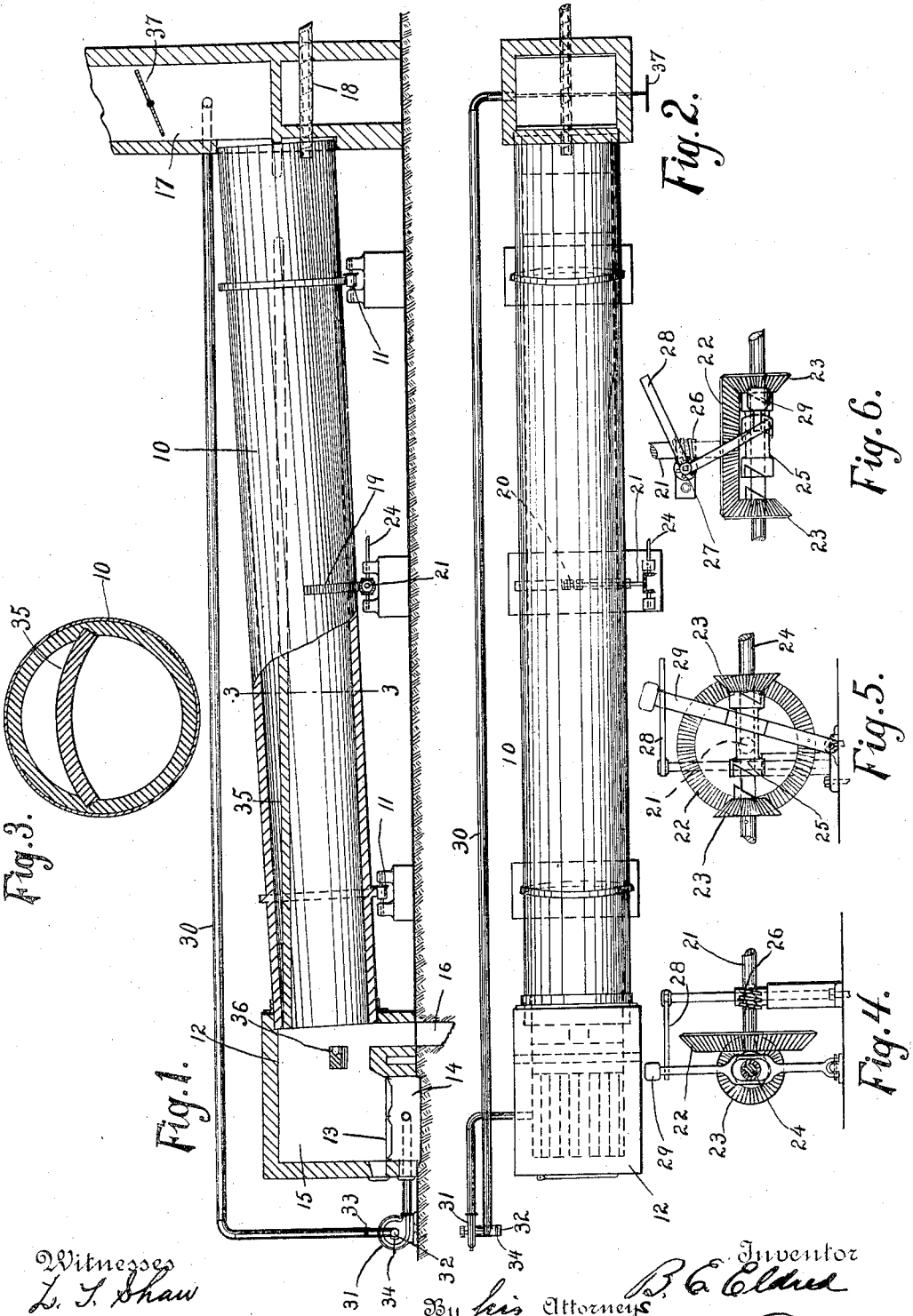

UNITED STATES PATENT OFFICE.

BYRON E. ELDRED, OF BRONXVILLE, NEW YORK, ASSIGNOR TO COMBUSTION UTILITIES COMPANY, OF NEW YORK, N. Y., A CORPORATION OF NEW YORK.

OSCILLATING CEMENT-KILN.

No. 812,834.

Specification of Letters Patent.

Patented Feb. 20, 1906.

Application filed January 23, 1905. Serial No. 242,220.

*To all whom it may concern:*

Be it known that I, BYRON E. ELDRED, a citizen of the United States, residing at Bronxville, county of Westchester, State of New York, have invented certain new and useful Improvements in Oscillating Cement-Kilns, of which the following specification and accompanying drawings disclose as an illustration one embodiment thereof which I now regard as the best out of the various forms in which the principles of my invention may be applied.

This invention relates to kilns for burning Portland cement.

On account of its many advantages the rotary kiln with cylindrical barrel has gone into very extensive use for the purpose of burning cement, among its desirable features being the simplicity and continuous character of the feeding operation, which is induced by a rotary motion of the combustion and calcining chamber or barrel in combination with its inclination from the horizontal, the durability of the kiln, &c. I have observed, however, that the efficiency of kilns of this type in point of fuel consumption is rather low as compared with other furnaces of the general reverberatory type, and I ascribe this deficiency largely to the fact that the cylindrical form of combustion-chamber, while well suited to the accomplishment of the progression or feed and stirring or overturning of the material during its subjection to the flames, is ill suited to the attainment of a maximum effect of the heating agent upon the materials, the roof, in fact, being much too high and far away from the materials in proportion to the width of the chamber to secure all the useful direct-heating effect and reverberatory or radiative effect which is attainable with a combustion-chamber of different shape. If the refractory roof were lower or nearer to the hearth on which the materials are supported, not only would these materials be more efficiently heated both by the flame and by reverberative action from the roof, but owing to the closer vertical confinement and lateral outspreading of the flame its own combustion would be promoted. This is especially important when the flame is produced by powdered fuel blown in with a blast, as it enables inferior grades of fuel to be used, or by the use of a predetermined proportion of neutral products of combustion in the draft-current, giving a long slow-burning flame, or by a combination of the two methods.

My invention aims to combine the advantages both of the rotary inclined cement-kiln and of the low-roofed reverberatory furnace; and to this end it consists in a kiln having a barrel mounted similarly to the ordinary cylindrical barrel, but possessing a low-arched interior and having imparted to it a rocking or oscillating movement instead of a unidirection or continuous rotary movement to feed the material.

An important advantage of the invention lies in the fact that it can be applied to rotary kilns of the ordinary type by building an arch across the interior of the barrel and changing over the driving mechanism.

Of the accompanying drawings, Figure 1 represents a longitudinal section of the cement-kiln with parts in elevation. Fig. 2 represents a plan view. Fig. 3 represents a section on the line 3 3 of Fig. 1. Figs. 4, 5, and 6 represent details of the barrel-oscillating mechanism.

The same reference characters indicate the same parts in all the figures.

In the drawings, 10 indicates a long cylindrical barrel lying prone and inclined in the usual manner and mounted upon rollers 11 11. I have shown an external fire-box working with a grate-fire producing a long flame by inflation with a diluent in accordance with the principles of my Patent No. 692,257, a flame having many of the advantages of the powdered-fuel blast; but it will be understood that the invention also applies to powdered-fuel kilns working either with or without the diluent. At the lower end is the external furnace 12, having grate 13, ash-pit 14 below the grate, and fire-chamber 15 above the grate opening into the interior of the barrel 10. There is also an outlet or chute 16 at this end for the burned-cement clinkers. At the higher end of the barrel is a stack 17 for the products of combustion and a screw conveyer 18 for supplying cement-forming material to the barrel.

The barrel 10 is given an oscillatory or rocking movement instead of a completely-rotating movement by mechanism including a worm-gear sector 19 on the barrel engaged by a worm 20 on a transverse shaft 21. This shaft has a bevel-gear 22 on its end engaging two bevel-pinions 23, loose on a powershaft 24, and the barrel is rotated in one direction or the other, according as the one or the other of these pinions is clutched to a sliding clutch member 25, feathered on shaft 24. On shaft 21 is a worm 26, engaging a worm-gear 27, having on its shaft a double-armed trip-lever 28, which operates a weighted lever 29, engaging the clutch member 25. At the limit of rotation of the barrel 10 in either direction the trip-lever 28 throws the weighted lever 29 over dead-center and shifts the clutch member 25, thereby reversing the movement of the barrel. This operation is kept up automatically. Any other suitable form of reversing mechanism could be employed in place of the one described.

30 is a return-conduit for products of combustion connecting the stack or chimney 17 with the ash-pit 14 and containing a fan-blower 31.

32 is an air-inlet to the conduit on the suction side of the fan, and 33 34 are chambers in the trunk-conduit and air branch, respectively, for regulating the relative quantities of air and products of combustion in the draft-current supplied to the ash-pit.

The barrel 10 has the usual metallic jacket and refractory fire-brick lining. In addition I spring a fire-brick arch 35 across the interior of the barrel from one end to the other, this arch being comparatively flat or of long radius and having its ends stepped in the side linings. The combustion-chamber is thereby included between this arch and the floor of the kiln and is tapered or contracted in approaching the stack 17 by locating the arch diagonally within the barrel, its forward end being nearer to the floor than its rear end. This tapering, though desirable, is not essential.

In operation the cement-forming material deposited on the floor of the barrel by the conveyer 18 feeds from the higher end to the lower end by reason of the rocking movement imparted to the barrel and is subjected to the flame from the fire-box 12, passing in the opposite direction toward the stack 17, the material finally falling into the chute 16 when completely calcined and cintered. The solid fuel supported on grate 13 furnishes a very long voluminous and slow-burning flame by reason of the inflation produced by a predetermined proportion of neutral gases or products of combustion in the draft-current furnished under artificial acceleration by the fan 31. The furnace is worked with closed doors and is kept relatively cool by the endothermic reaction of the products of combustion with the fuel. This relatively cool flame is suited to the preliminary calcination or decarbonization of the lime in the cement-forming material. A locally-intensified combustion for effecting the final cintering of the clinkers may be furnished by an injection of air under pressure from a flame-septum 36, this feature, however, being claimed in another application. The refractory arch 35 serves to confine the flame in a vertical direction in closer relation to the materials on the floor of the barrel, more especially in its remote portions, than it would be if the vertical diameter of the combustion-chamber coincided with the full interior diameter of the barrel 10, and the reverberative effect of the refractory roof of said combustion-chamber, both upon the flame itself and upon the materials under treatment, is increased by the nearer presence of this roof to the floor of the kiln. At the same time I retain a trough-shaped floor curved on a radius from the center of oscillation and well suited to the feeding of the material and tumbling it over so as to subject all parts uniformly to the flame. The roof forms a curved chord of the complete circle drawn to this radius.

The tapering combustion-chamber provided by the foregoing construction harmonizes with the conditions of flame-development, according to which there is a theoretical contraction of about one-third in the volume of the carbonaceous gases in passing from the monoxid to the dioxid condition, (neglecting the expansive effects of heat.)

What I claim as new, and desire to secure by Letters Patent, is—

1. A cement-kiln having an inclined barrel provided with flame-producing means at its lower end, and at its higher end a stack and material-supplying means, said barrel having refractory interior walls forming a combustion-chamber of flattened internal cross-section tapering from a larger vertical diameter at the lower end to a smaller vertical diameter at the stack end, and means for automatically rocking said kiln.

2. A cement-kiln comprising a prone combustion-chamber whose interior tapers from a larger diameter at one end to a smaller diameter at the other end, flame-producing means at the larger end, an outlet at the smaller end for products of combustion, means to supply cement-forming material to the smaller end, and a double roof for said kiln, including a dead-air space.

3. A cement-kiln comprising an inclined oscillatory barrel having a refractory floor curved to a relatively short radius and a refractory roof curved to a longer radius, whereby the lateral diameter exceeds the vertical diameter, means to supply cement-forming material at the higher end, means to automatically rock said barrel, and flame-producing means at the lower end.

4. A cement-kiln comprising an inclined oscillatory barrel having a refractory floor curved to a relatively short radius and a refractory roof curved to a longer radius, whereby the lateral diameter exceeds the vertical diameter, said floor and roof approaching each other in the direction of the higher end, means for passing a stream of material through said barrel from the higher to the lower end, and means for passing a flame through said barrel in the opposite direction.

5. A cement-kiln comprising an inclined oscillatory barrel of cylindrical exterior form, and a flattened refractory wall crossing the intermediate portion of the interior of said barrel and forming the roof of the combustion-chamber.

6. A cement-kiln comprising an inclined oscillatory barrel having a combustion-chamber tapering toward the higher end of the barrel, a stack at the higher end, a seat of combustion at the lower end, and means for supplying through said seat a draft-current of air and neutral products of combustion in predetermined proportion.

7. A cement-kiln comprising an inclined barrel having refractory inner walls forming a combustion-chamber of larger lateral than vertical diameter and tapering from the lower toward the higher end of the barrel, a stack and material-supplying means at the higher end, a clinker-outlet at the lower end, an exterior furnace at the lower end having grate, ash-pit below the grate and fire-chamber above opening into the barrel, a return-conduit for products of combustion connecting the stack with the ash-pit, a fan-blower in said conduit, an air-inlet to said conduit on the suction side of the fan, and means for regulating the relative quantities of air and products of combustion in the draft-current supplied to the ash-pit.

8. A cement-kiln comprising an inclined rotatory barrel, a refractory floor for feeding the material, curved on a circle concentric with the axis of rotation, a low refractory roof lying within the circle if completed, and means to automatically impart oscillatory movement to said barrel to feed the material.

9. A cement-kiln comprising an inclined barrel having combustion-chamber with refractory walls and of greater lateral width than vertical height, means to supply cement-forming material at the higher end, means to project a flame from the lower end, and means to automatically rock said barrel.

In witness whereof I have hereunto set my hand this 4th day of January, 1905.

BYRON E. ELDRED.

Witnesses:
OWEN WARD,
GEO. W. LEWIS.